United States Patent [19]

Siegart et al.

[11] 3,784,362

[45] Jan. 8, 1974

[54] ANTI-STATIC FUEL COMPOSITION

[75] Inventors: William R. Siegart, Poughkeepsie, N.Y.; William D. Blackley, Lake Elmo, Minn.; Harry Chafetz, Poughkeepsie, N.Y.

[73] Assignee: Texaco Inc., New York, N.Y.

[22] Filed: June 21, 1972

[21] Appl. No.: 265,030

[52] U.S. Cl. ............. 44/62, 44/79, 44/DIG. 2, 260/618 D, 260/633
[51] Int. Cl. .................................................. C10l 1/16
[58] Field of Search ............. 44/62, 79, 66, DIG. 2; 260/618 D, 633

[56] References Cited
UNITED STATES PATENTS

| | | | |
|---|---|---|---|
| 3,513,206 | 5/1970 | Wall et al. | 260/618 D |
| 3,719,698 | 3/1973 | Tesoro et al. | 260/618 D |
| 3,677,725 | 7/1972 | Andress, Jr. | 44/62 |
| 3,003,858 | 10/1961 | Andress, Jr. et al. | 44/62 |

*Primary Examiner*—Daniel E. Wyman
*Assistant Examiner*—Y. H. Smith
*Attorney*—Thomas H. Whaley et al.

[57] ABSTRACT

Anti-static fuel composition containing the reaction product of an organic hydroxy compound having the formula ROH in which R is a hydrocarbyl radical having from 2 to 30 carbon atoms and a fluorinated polymer from the group consisting of fluorinated polystyrene and fluorinated polypropylene.

10 Claims, No Drawings

ANTI-STATIC FUEL COMPOSITION

BACKGROUND OF THE INVENTION

1. Field of Invention

Distillate hydrocarbon fractions, such as gasoline, kerosene, diesel oil and furnace oil, are highly inflammable materials and must be protected from accidental ignition. Another property of these fuels is that they are relatively non-conductive with respect to electricity.

Very large volumes of these liquid fuels are transferred daily through pipelines, hoses and like equipment. Because the volumes are large, many transfer operations are conducted using high velocity pumping means as in the loading of ships, storage tanks and aircraft. Because of the non-conductive nature of these normally liquid hydrocarbons, static electricity builds up and accumulates in the fuel in the high speed pumping operations. This static electricity buildup is inherently dangerous and is known to have caused disastrous fires and explosions in the past.

The present invention is directed to novel reaction products which provide improved electrical conductivity characteristics to petroleum products. This invention also provides a novel method for preparing hydrocarbon soluble derivatives of insoluble fluorocarbons.

2. Description of the Prior Art

Fluorinated hydrocarbons including fluorinated polystyrene and fluorinated polyolefins are well known in the art. Fluorinated polystyrene having the empirical formula $(C_{16}H_3F_{25})_x$ and a method for preparing these compounds is disclosed in U.S. Pat. No. 3,380,983. According to this patent, a fluorinated polystyrene is prepared by contacting a polystyrene having a molecular weight between about 10,000 and 500,000 with gaseous fluorine in the presence of an alkali metal fluoride catalyst at a temperature between about 20° and 105° C. The resulting products have the empirical formula $(C_{16}H_3F_{25})_x$ where $x$ is 3 to 5 and having a melting point of 85° to 90° C.

A specific fluorinated styrene disclosed in this patent is represented by the empirical formula:

$$(C_{16}H_3F_{25})_{3.87}$$

has a molecular weight of 2590 and a melting point of 85°–90° C. This fluorinated polystyrene comprises a mixture of telomeric compounds of varying chain length having an average of 3.87 repeating units where each repeating $C_{16}H_3F_{25}$ unit in the chain consists of two chemically fluorinated cyclohexane analogs of styrene.

Amine derivatives of fluorinated polystyrene and fluorinated polypropylene and a method of preparing them in the presence of a tertiary amine is the subject of U.S. Pat. No. 3,652,238.

SUMMARY OF THE INVENTION

The anti-static fuel composition of the invention comprises a mixture of hydrocarbons in the gasoline, kerosene, diesel oil and furnace oil boiling ranges containing a minor amount of the reaction product of an organic hydroxy compound with either a fluorinated polystyrene or a fluorinated polypropylene. More specifically, the fuel composition, which will generally boil from about 90° to about 750° F., contains an effective anti-static amount of the reaction product of an alcohol or phenol compound having the formula ROH in which R is a hydrocarbyl radical having from 2 to 30 carbon atoms and either a fluorinated polystryrene represented by the empirical formula:

$$(C_{16}H_3F_{25})_x$$

in which $x$ has a value from 3 to 5, or a fluorinated polypropylene represented by the empirical formula:

$$(C_3HF_5)_x$$

in which $x$ has a value from 20 to 40. The method for preparing the reaction product involves reacting the corresponding fluorinated polymer with the prescribed organic hydroxy compound at a temperature in the range of 50° to 200° C. and in the presence of a catalyst from the group consisting of tertiary amines having the formula $R_3N$ in which R is the same or different aliphatic radicals having from 1 to 30 carbon atoms or the alkali metal salt of the organic hydroxy compound having the formula ROM where M represents an alkali metal, such as sodium, potassium or lithium.

The preparation of the fluorinated polystyrene component of the reaction product of the invention having the empirical formula $(C_{16}H_3F_{25})_x$ in which $x$ is an average interger between 3 to 5 is fully described in U.S. Pat. No. 3,380,983 referred to above.

The fluorinated polypropylene component of the reaction product of the invention was prepared in essentially the same process used for the fluorinated polystyrene. In general, a solid polypropylene having a specific gravity from about 0.880 to 0.908 is deposited on sodium floride and dried and ground in a mill to pass through a 1 mm screen. The treated polypropylene is charged to a reactor and the reaction mixture chilled. Fluorine diluted with nitrogen is added to the stirred reaction mixture until fluorine is detected coming from the reactor. The reaction is then continued at room temperature until fluorine is detected coming from the reactor at which time the reactor is heated to an elevated temperature about 85° C. and the reaction continued until fluorine issues from the reactor. The reactor is flushed with nitrogen and the fluorinated polypropylene recovered by solvent extraction as disclosed in the abovenoted patent. The fluorinated polypropylene product has the empirical formula $(C_3HF_5)_x$ in which $x$ has a value from about 20 to 40 preferably from 23 to 35.

The fluorinated polystyrene and fluorinated polypropylene noted above are reacted with the prescribed organic hydroxy compound to form the corresponding alcohol or phenol reaction product which provides anti-static properties to liquid hydrocarbon fuels and fuel oil compositions. In general, this method involves the reaction of a fluorinated polymer containing at least one unsubstituted hydrogen atom with an organic hydroxy compound having the formula ROH in which R is a hydrocarbyl radical having from about 2 to 30 carbon atoms, the reaction being conducted in the presence of a tertiary amine or an alkali metal catalyst. The preferred compounds are those in which R has a value from 8 to 20 carbon atoms with the most preferred having from 12 to 18 carbon atoms. This reaction is generally conducted at a temperature in the range of 50° to 200° C. and preferably at a temperature from 80° to 150° C.

The tertiary amine catalyst which can be employed in the reaction includes trimethylamine, triethylamine, tripropylamine, tributylamine, triamylamine, trioctylamine, pyridine, pyrimidine, pyrazine and the like. In general, the tertiary amine catalyst can be represented by the formula $R_3N$ where R is a hydrocarbon radical, preferably an alkyl radical having from 1 to 30 carbon atoms. It is also understood that the R's can be connected to form a cyclic tertiary amine compound.

The alkali metal catalyst which can be employed is the alkali metal salt of the organic hydroxy compound in the reaction. This catalyst is represented by the formula ROM where R is a hydrocarbyl radical having from 2 to 30 carbon atoms and M represents an alkali metal, sodium, potassium or lithium.

The reaction is conducted using approximately one equivalent of the organic hydroxy compound and two equivalent of the tertiary amine or alkali metal salt catalyst for each hydrogen atom in the fluorinated polymer.

The following examples illustrate the preparation of the organic hydroxy compound-fluorinated polymer reaction products of this invention.

EXAMPLE I

PREPARATION OF THE ETHYL ALCOHOL DERIVATIVE OF CHLORINATED POLYSTYRENE 40 cc of absolute ethanol and 2.3 grams of freshly cut sodium were charged to a reaction vessel. After the sodium had completely reacted, 10 grams of fluorinated polystyrene having the formula $(C_{16}H_3F_{25})_{3.87}$ from U.S. Pat. No. 3,380,983 were charged to the reaction vessel, and the mixture refluxed for 15 hours, cooled to room temperature, poured into 200 milliliters of water, filtered, and the solids washed and dried. A yield of 10.1 grams was obtained having a melting point of 170° to 175° C. Analysis showed the presence of CH, olefin, CF and cyclohexane absorption. The product was soluble at room temperature and at reflux in acetone, tetrahydrofuran, ethyl acetate, acetic acid and diethyl ether. The product was not soluble at room temperature in dichloromethane, pentane, benzene, or water. Elemental analysis of the product showed:

% C — 34.5
% H — 2.1
% F — 56.9

EXAMPLE II

PREPARATION OF NONYLPHENOL FLUORINATED POLYSTYRENE REACTION PRODUCT

Sixth-six grams of nonylphonol, 200 ml. of 1,4-dioxane, and 7.0 grams of sodium were refluxed until all the sodium was reacted. Fluorinated polystyrene (30 grams) was charged to the flask and the mixture refluxed for 16 hours, diluted with an equal volume of pentane and filtered. The solvent was removed from the filtrate under water aspirator vacuum and the residue dissolved in pentane, filtered and the filtrate extracted two times with alcoholic KOH (the alcoholic KOH solution for each extraction was 100 ml. each of water and methanol and 10 grams of KOH). The pentane was removed under water aspirator vacuum and the product dried. Yield 26 grams, color brown, melting point: 80°-95° C., infrared analysis confirmed the preparation of the desired derivative. Elemental analysis: percent Carbon — 45.8; percent Hydrogen — 4.6; percent Flourine — 34.3; molecular wt. = 3,930.

EXAMPLE III

PREPARATION OF THE STEARYL ALCOHOL-FLUORINATED POLYSTYRENE REACTION PRODUCT 50 grams of fluorinated polystyrene similar to that in Example 1, 25 grams of triethylamine and 100 cc of 1,4-dioxane were refluxed together in a reactor, filtered, washed and dried.

59.4 grams of stearyl alcohol, 300 cc of 1,4-dioxane and 5.1 grams of freshly cut sodium were refluxed together in a separate vessel for 56 hours, during which time all of the sodium had reacted. The amine-treated fluorinated polystyrene was added to the stearyl alcohol-sodium reaction mixture and the entire mixture refluxed for 16 hours. The mixture was cooled to room temperature and filtered. The solvent was removed from the filtrate under water aspirator vacuum and the residue extracted twice with 200 ml. portions of pentane. The solvent was then removed under the water aspirator vacuum and the residue extracted with 100 ml 95 percent ethanol. The insoluble material remaining (the desired product) was dried under reduced pressure. Yield — 19.2 g; melting point 48° C; infrared confirmed the product was an alcohol derivative of fluorinated polystyrene, percent F = 10.0, molecular wt. = 439.

EXAMPLE IV

PREPARATION OF LAURYL ALCOHOL DERIVATIVE OF FLUORINATED POLYSTYRENE 50 grams of fluorinated polystrene similar to Examle I 25 grams triethylamine, and 200 cc of 1,4-dioxane were charged to a reactor and refluxed for 8 hours, filtered and the solvent removed under reduced pressure. The residue was combined with the solvent insoluble material and then washed with water and dried.

41.0 grams of lauryl alcohol, 300 cc of 1,4-dioxane and 5.1 grams of sodium were refluxed together in a second reactor for 34 hours during which time the sodium completely reacted. The amine-treated fluorinated polystyrene from the first step was charged to the second reactor and the mixture refluxed for 16 hours. The products were separated by filtration. The insoluble material was dried and extracted with two 300 cc portions of pentane and the pentane solution filtered. The insoluble material was dried and extracted with two 400 cc portions of water. The insoluble material (the desired product) was dried under reduced pressure. Yield — 21.8 g; a brown solid melting point 155° C. Infrared confirmed the product was an alcohol derivative of flourinated polystyrene. The product was very slightly soluble both at room temperature and at reflux in tetrahydrofuran carbo tetrachloride, ethyl acetate, acetone, benzene, 1,4-dioxane, isopropyl alcohol, ethyl alcohol, methylene chloride, chloroform, methyl alcohol, diethylether, and Freon 113. It was insoluble both at room temperature and at reflux in pentane, FC-75 and water. Percent flourine = 50.4.

EXAMPLE V
PREPARATION OF THE LAURYL ALCOHOL DERIVATIVE OF FLUORINATED POLYPROPYLENE 30.0 of fluorinated polypropylene from Example I of U.S. Pat. No. 3,652,238, 10.1 of triethylamine and 100 milliliters of 1,4-dioxane were charged to a reactor, refluxed for 8 hours and filtered.

75 cc of lauryl alcohol and 2.9 grams of sodium were charged to a second reactor and heated until the sodium had completely reacted. The amine treated flourinated polypropylene and the sodium salt of lauryl alcohol were combined and the stirred suspension heated at approximately 100° C. for 18 hours. The flask was cooled to room temperature and 200 cc of 95 percent ethanol added. The suspension was filtered and the insoluble material was dried under reduced pressure and extracted with two 250 cc portions of pentane. The pentane contained the desired product and was separated from the insoluble material by filtration. The pentane solvent was removed under water aspirator vacuum to yield a light viscous oil. Wt. 9.0 g; infrared analysis confirmed formation of the desired alcohol derivatives. Elemental analysis: percent Carbon = 56.8; percent Hydrogen = 8.7, mol. wt. - 856.

The hydrocarbon base fuel for the fuel composition of the invention is any distillate hydrocarbon or mixture of hydrocarbons in the gasoline, kerosene, diesel oil and/or furnace oil boiling ranges. In general, these normally liquid hydrocarbon fractions boil in the range from about 90° to 750° F. The hydrocarbon mixture may consist of saturated and unsaturated aliphatic, cycloaliphatic and aromatic hydrocarbons within the noted boiling range. Specific fractions which can be employed for preparing the fuel compositions of the invention include gasoline boiling from about 90° to 425° F., kerosene boiling from about 300° to 525° F., gas oil and diesel oils boiling from about 390° to 750° F. and furnace oils boiling from about 300° to 750° F. or higher.

The anti-static fuel composition of the invention is prepared by blending a minor anti-static effective amount of the prescribed additive in a base fuel. In general, the anti-static additive is employed at a very low concentration ranging from about 0.01 to 1,000 ppm. (weight parts per million parts of fuel). A preferred concentration range is from about 0.05 to 25 ppm, with the most preferred range being from 0.1 to 10 ppm.

The electrical conductivity or anti-static properties of the base fuel and of the fuel compositions of the invention were determined in a Resistivity Test according to ASTM Method D1169–64. In this test, the resistivity of fuel is tested by the electrical conductivity found between two electrodes immersed in the fuel samples.

The base fuel employed in these tests was a typical turbine or jet fuel having the following inspection values:

API Grav., at 60°F. — 43.4
ASTM Dist.,
  IBP °F. — 334
  10% — 362
  30 — 382
  50 — 404
  70 — 432
  90 — 466
  95 — 488
  E.P. — 511
Net. Heat of Comb. BTU/lb — 18,438
Luminometer No. — 51.0
Freezing Point, °F — −64
Net Heat of Comb. BTU/gallon — 124,200

The electrical conductivity of the fuel compositions expressed in Resistance in ohm-cm is set forth in the following Table. The additive concentration employed was 1 ppm.

TABLE 1

| Run. | Additive | Resistance ohm-cm |
|---|---|---|
| 1 | None - base fuel | $1,533 \times 10^{12}$ |
| 2 | Example II | $14 \times 10^{12}$ |

It is evident from the data that the anti-static fuel composition of the invention is highly effective for improving the electrical conductivity of the hydrocarbon base fuel. These fuel compositions are considered to be equal or superior in their anti-static properties to a fuel composition containing a commercial anti-static additive.

We claim:

1. A fuel composition comprising a mixture of hydrocarbons boiling from about 90° to 750° F. containing a minor anti-static effective amount of a reaction product of an organic hydroxy compound having the formula ROH in which R is hydrocarbyl radical having from 2 to 30 carbon atoms and a fluorinated polymer selected from the group consisting of 1) a fluorinated polystyrene having the empirical formula:

$(C_{16}H_3F_{25})_x$ where $x$ has a value from 3 to 5, and 2) a fluorinated polypropylene having the formula:

$(C_3HF_5)_x$ where $x$ has a value of 20 to 40.

2. A fuel composition according to claim 1 in which said fluorinated polystyrene has the formula:

$$(C_{16}H_3F_{25})_{3.87}$$

3. A fuel composition according to claim 2 in which said organic hydroxy compound is ethyl alcohol.

4. A fuel composition according to claim 2 in which said organic hydroxy compound is nonylphenol.

5. A fuel composition according to claim 1 in which said fluorinated polypropylene has the empirical formula:

$$(C_3HF_5)_x$$

in which $x$ has a value from 23 to 35.

6. A fuel composition according to claim 1 in which said organic hydroxy compound is stearyl alcohol.

7. A fuel composition according to claim 1 in which said organic hydroxy compound is lauryl alcohol.

8. A fuel composition according to claim 1 in which the mixture of hydrocarbons are in the gasoline and/or kerosene boiling ranges.

9. A fuel composition according to claim 1 in which the mixture of hydrocarbons are in the furnace oil boiling range.

10. A fuel composition according to claim 1 containing from about 0.01 to 1,000 weight parts per million parts of said reaction product of said organic hydroxy compound and said fluorinated polymer.

* * * * *